United States Patent [19]

Robbins et al.

[11] Patent Number: 4,857,084
[45] Date of Patent: Aug. 15, 1989

[54] PRESSURE SWING ADSORPTION APPARATUS AND PROCESS FOR RECOVERY OF OIL-SOLUBLE VAPORS

[75] Inventors: Lanny A. Robbins; Timothy C. Frank, both of Midland, Mich.

[73] Assignee: The Dow Chemical Company, Midland, Mich.

[21] Appl. No.: 204,824

[22] Filed: Jun. 10, 1988

[51] Int. Cl.$^4$ .............................................. B01D 53/04
[52] U.S. Cl. ............................................ 55/58; 55/74; 55/180; 55/208; 55/267; 55/387
[58] Field of Search .................. 55/25, 26, 28, 48, 58, 55/62, 74, 179, 387, 267, 208, 180

[56] References Cited

U.S. PATENT DOCUMENTS

| | | | |
|---|---|---|---|
| 2,390,536 | 12/1945 | Houdry et al. | 55/58 |
| 3,045,716 | 7/1962 | Morgan et al. | 55/48 X |
| 3,225,518 | 12/1965 | Skarstrom et al. | 55/33 |
| 3,346,484 | 10/1967 | Lewis | 55/58 X |
| 4,056,369 | 11/1977 | Quackenbush | 55/58 |
| 4,066,423 | 1/1978 | McGill et al. | 55/48 |
| 4,104,039 | 8/1978 | Kuri et al. | 55/23 |
| 4,276,058 | 6/1981 | Dinsmore | 55/58 X |
| 4,282,013 | 8/1981 | Franklin et al. | 55/48 |
| 4,305,734 | 12/1981 | McGill | 55/25 |
| 4,338,101 | 7/1982 | Tuttle | 55/58 X |
| 4,343,629 | 8/1982 | Dinsmore et al. | 55/58 X |
| 4,421,532 | 12/1983 | Sacchetti et al. | 55/28 |
| 4,462,811 | 7/1984 | Dinsmore et al. | 55/58 X |
| 4,614,525 | 9/1986 | Reiss | 55/58 X |
| 4,670,028 | 6/1987 | Kennedy | 55/58 X |
| 4,715,868 | 12/1987 | Kennedy | 55/58 X |

OTHER PUBLICATIONS

"Reitschle Product-Info" (phamphlet).
"Handling Wet and Corrosive Gases with Mechanical Vacuum Pumps" (phamphlet), by Gerhard Baratti, Rietschle GmbH, 9 pages (1485 U.S.A.).

*Primary Examiner*—Robert Spitzer

[57] ABSTRACT

In a pressure swing adsorption system used to recover an oil-soluble solvent, monomer or hydrocarbon vapor such as 1,1,1-trichloroethane or styrene from a gaseous stream such as air, an oil-sealed vacuum pump may be used without substantial absorption of vapor into the oil if the oil in the pump is heated to a temperature substantially above the dew point of vapor in the gas stream leaving the pump.

17 Claims, 1 Drawing Sheet

PRESSURE SWING ADSORPTION APPARATUS AND PROCESS FOR RECOVERY OF OIL-SOLUBLE VAPORS

BACKGROUND OF THE INVENTION

The present invention relates to the art of recovering vapors, and more particularly vapors of solvents, monomers and hydrocarbons, from gas streams.

It is known to recover organic vapors by passing the gas stream through an adsorbent bed containing a substance such as activated carbon upon which the vapor is adsorbed. It is also known to desorb the organic vapor from the bed by maintaining a steady temperature in the bed and lowering pressure within the bed. Known systems are described in Skarstrom et al., Closed System Heatless Dryer, U.S. Pat. No. 3,225,518 (Dec. 28, 1965) and Kuri et al., Process for Concentrating or Liquefying a Specified Component of a Gaseous Mixture, U.S. Pat. No. 4,104,039 (Aug. 1, 1978), which are incorporated herein by reference.

Systems known in the art ordinarily use a plurality of adsorption beds. A feedstream containing organic vapor is passed through one bed under conditions at which adsorption will occur for a period of time short enough that the heat of adsorption remains substantially in the bed. Afterwards, the feedstream is redirected to a second bed. Presure is reduced in the first bed using a vacuum pump so that desorption occurs and a slight backpurge passing through the bed carries the desorbed organic vapor out of the bed. The desorbed vapor and backpurge gas pass through the pump to a codenser where at least some of the solvent is condensed and recovered. The remaining backpurge gas and desorbed vapor are recycled into the feedstream. The desorption step is halted in time to receive the feedstream back from the second bed so that the second bed can undergo desorption. Thereafter, the beds are alternately adsorbed and desorbed so that the system as a whole can be operated continuously.

In practice, the economic efficiency of such pressure swing adsorption systems is decreased by the limited choice of vacuum pumps which can be used in the system. The pump must draw enough of a vacuum to quickly and efficiently desorb the organic vapor which is adsorbed on the bed.

The least expensive and most efficient pumps for accomplishing the low pressures necessary are oil-sealed pumps. Oil-sealed pumps such as the rotary vane and rotary piston pumps cannot be used to recover oil-soluble compounds, such as 1,1,1-trichloroethane or styrene monomer, because the vapor dissolves in the oil as the desorbed vapor and backpurge gas pass through the pump. That thinning of the oil hurts the lubrication and seal within the pump and floods the pump.

Non-oil seal pumps capable of obtaining similar low pressures are ordinarily much more expensive than oil-sealed pumps.

An apparatus and a process are needed which permit the use of an oil-sealed pump in pressure swing adsorption to remove oil-soluble vapors from a gas stream.

SUMMARY OF THE INVENTION

In one aspect, the present invention is an apparatus for recovering an oil-soluble solvent, monomer or hydrocarbon vapor from a gaseous feedstream comprising:

(1) a plurality of adsorption beds containing a material effective to adsorb said oil-soluble vapor in an amount sufficient to adsorb substantial amounts of said oil-soluble vapor;

(2) a feed means for controllably directing said feedstream into said beds;

(3) a backpurge means for controllably permitting a flow of backpurge gas through each said bed in a direction counter to the flow of said feedstream, when said bed is not receiving said feedstream;

(4) an oil-sealed vacuum pump capable of maintaining oil within the pump at a temperature hot enough to restrict absorption of said oil-soluble vapor into the oil, said pump having an inlet and an outlet;

(5) a conduit means controllably connected to each adsorption bed and to the inlet on said vacuum pump, such that said pump may place each bed under reduced pressure while it is not receiving said feedstream, thereby desorbing at least some of said oil-soluble vapor and drawing said desorbed oil-soluble vapor and backpurge gas through said conduit means into the inlet on said vacuum pump; and (6) a vapor receiving means which receives desorbed oil-soluble vapor and backpurge gas from the outlet of said vacuum pump and uses or disposes of said vapor.

Another aspect of the present invention is a process for recovering oil-soluble solvent, monomer or hydrocarbon vapors from a gaseous feedstream comprising the steps of:

(1) passing said gaseous feedstream containing oil-soluble vapors through a first adsorption bed containing a material effective to adsorb said solvent under conditions at which substantial oil-soluble vapor is adsorbed;

(2) redirecting the flow of said gaseous feedstream to a second adsorption bed;

(3) placing said first adsorption bed under reduced pressure generated by an oil-sealed vacuum pump in the presence of a backpurge gas stream running counter to the direction in which said gaseous feedstream flowed, under conditions such that oil-soluble vapor adsorbed upon said bed is desorbed and flows out of said bed with said backpurge stream;

(4) drawing said desorbed oil-soluble vapor and backpurge gas stream through said oil-sealed vacuum pump while maintaining the oil in said pump at a temperature such that absorption of vapor into the oil is restricted; and (5) passing desorbed oil-soluble vapor and backpurge gas from said vacuum pump to a vapor receiving step wherein said desorbed oil-soluble vapor is used, recovered or disposed.

Using the apparatus and process of the present invention, solvent, monomer and hydrocarbon vapors can be removed from a gaseous feedstream using a pressure swing adsorption system that uses a less expensive oil-sealed pump.

BRIEF DESCRIPTION OF THE DRAWING

The drawing shows a preferred apparatus of the present invention useful to practice a preferred process of the present invention, wherein the desorbed oil-soluble vapor is condensed and recovered and uncondensed vapor and backpurge gas are returned to the feedstream. The apparatus contains a line for carrying a feedstream which can direct said feedstream to either or both of two adsorption beds. The apparatus also contains a heated oil-sealed vacuum pump which can draw a vacuum on either one of the adsorption beds. The apparatus also contains a condenser and a condensate recovery tank to condense and recover at least some vapor passing from the vacuum pump and a recycle line to recycle the uncondensed stream back into the feedstream.

DETAILED DESCRIPTION OF THE INVENTION

Figure 1:
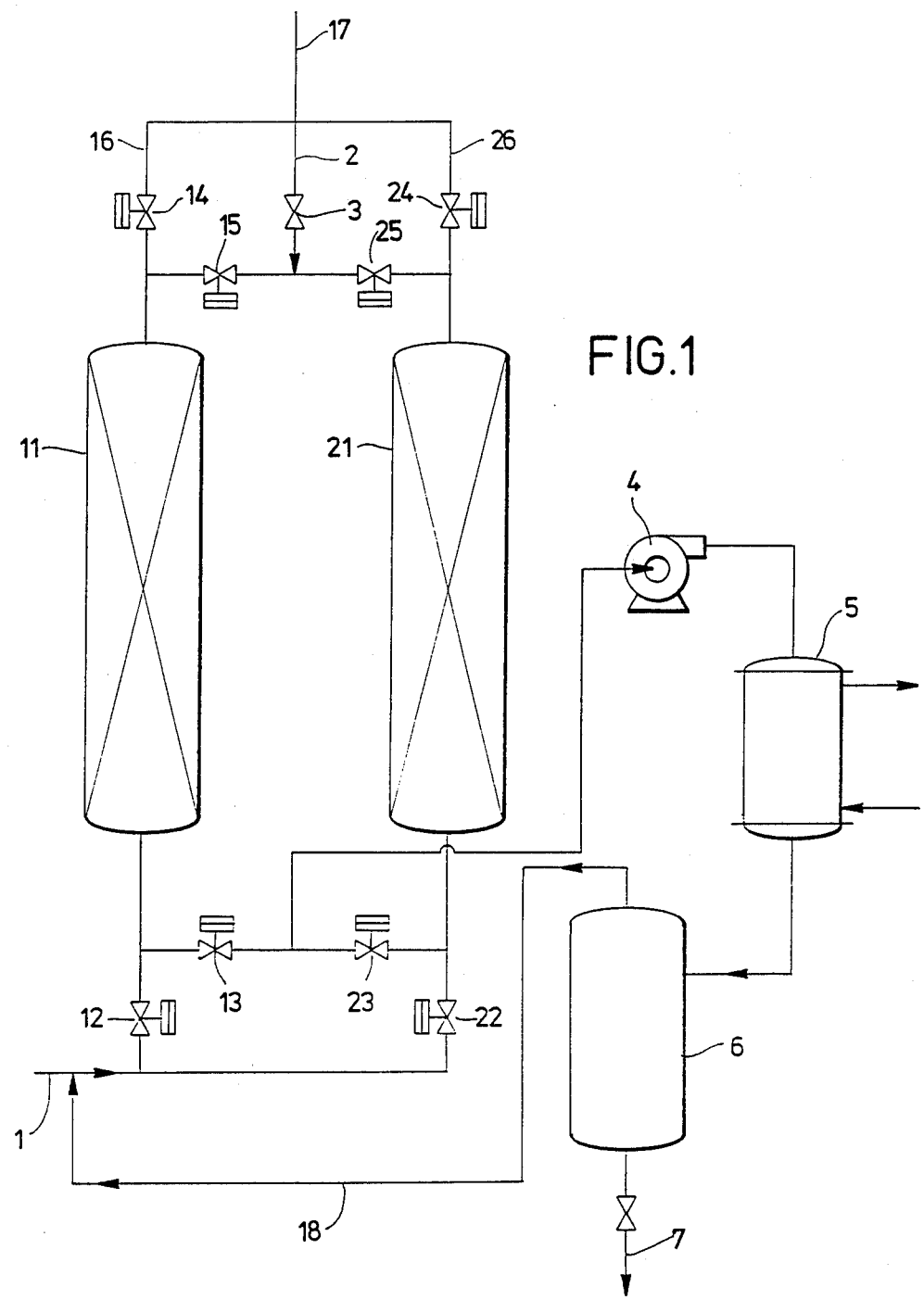

The present invention is used to separate a solvent, monomer or hydrocarbon vapor from a gas stream. Although the invention may be used to separate any solvent, monomer or hydrocarbon vapor which can be adsorbed and desorbed, it is particularly intended for recovering vapors which are soluble in oil at ordinary operating temperatures of vacuum pumps. The invention is more particularly suited for use with organic vapors of compounds whose boiling point is at least about 35° C. at atmospheric pressure; and most particularly for use with vapors of compounds having a boiling point of at least about 40° C. It is highly suitable for recovering halogenated hydrocarbons and aromatic hydrocarbons, more highly suitable for halogenated alkanes and aromatic hydrocarbons, and most highly suitable for 1,1,1-trichloroethane and styrene monomer. Some examples of vapors which may be separated using the present invention are 1,1,1-trichoroethane, methylene chloride, benzene, toluene, pentane, hexane, carbon tetrachloride, bromochloromethane, 1,2-butylene oxide, styrene, and ethanol.

The oil-soluble vapor is recovered from a gas stream. The gas may be any gas which does not adversely effect the apparatus used to practice the process and which tends to adsorb upon the adsorbent material of the beds to a substantially lesser extent than does the oil-soluble vapor under process conditions. It more preferably condenses at lower temperatures and higher pressures than does the oil-soluble vapor. The gas may be, for instance, air, oxygen, nitrogen or argon. The gas is most typically air.

The oil-soluble vapor is removed from the feed gas stream by passing the stream through an adsorption bed which comprises a material that is effective to adsorb said oil-soluble vapor and is present in an amount sufficient to adsorb substantial amounts of oil-soluble vapor. For the purposes of the present application, the term adsorption means that the oil-soluble vapor becomes associated with the adsorbent material and removed from the feedstream in a manner which can be readily reversed by reduction of pressure in the presence of a backpurge stream of gas. Desorption indicates the reverse process.

Techniques and materials to make adsorption beds are known in the art, and useful beds are commercially available. Useful materials for making the beds are listed in Kuri et al., U.S. Pat. No. 4,104,039, supra, at column 5, lines 33–47, which is incorporated herein by reference. The proper choice of adsorbent material varies in a manner familiar to persons of ordinary skill in the art depending upon the oil-soluble vapor to be recovered. The beds preferably comprise activated carbon or styrene/divinylbenzene microporous resin beads.

Because oil-soluble vapor adsorbed upon the bed must be desorbed, it is preferable to have a plurality of beds. In that way, the gas stream may be passed over a second bed while oil-soluble vapor is desorbed from the first bed. Adsorption and desorption steps may be alternated in each bed so that at least one bed is adsorbing at all times. Systems having only one bed could be practiced, but are impractical since adsorption would have to be shut down during desorption of that bed.

The concentration of oil-soluble vapor in the gas stream leaving the adsorption bed is preferably at least 95 percent less than the concentration of oil-soluble vapor in the feedstream, more preferably at least 99 percent less, and most preferably at least 99.9 percent less. The gas may be used for purposes which can tolerate the remaining oil-soluble vapor or vented or further treated.

Preferably, the adsorption step is continued in each bed for a period of time short enough that the heat of adsorption is substantially retained in the bed until the desorption step commences. By adsorbing for only a short time, the desorption of oil-soluble vapor can later be carried out in the presence of retained heat without adding additional heat. The best length of time for adsorption steps will vary with individual systems in a manner readily ascertainable by experimentation, depending upon factors such as the bed size and material, the oil-soluble vapor, the temperature of the bed, and the pressures applied in adsorption and desorption. Preferably, a single adsorption step is continued for no more than about 30 minutes, more preferably no more than about 20 minutes, and most preferably no more than about 10 minutes. The minimum time for an adsorption step is limited primarily by practical considerations. The minimum is preferably at least about 30 seconds, more preferably at least about 2 minutes, and most preferably at least about 5 minutes. Preferably, the bed's capacity to adsorb oil-soluble vapor is not completely exhausted when the adsorption step ceases.

After the adsorption step, oil-soluble vapor is desorbed from the bed. Desorption is carried out at a reduced pressure low enough for the oil-soluble vapor to desorb at the temperature of the bed in the presence of a flow of backpurge gas. Optimal pressures for desorption vary in a manner familiar to persons skilled in the art, depending upon factors such as the size of the bed, the material used in the bed, the amount and nature of the oil-soluble vapor adsorbed upon the bed, the temperature of the bed and the rate of back current flow. The pressure is preferably no more than about 300 mm Hg, more preferably no more than about 100 mm Hg, and most preferably no more than about 50 mm Hg. For some applications it may be desirable to go as low as 40 mm Hg. For others, operation at the high end of the preferred pressures may be desirable.

During desorption, a backpurge means permits a slight stream of backpurge gas to flow counter the direction of the feed gas flow so that desorbed oil-soluble vapor is carried out of the bed. The backpurge gas, like the gas of the feedstream, may be any gas which does not adversely effect the apparatus and which is adsorbed upon the adsorbent material substantially less strongly than is the oil-soluble vapor. Preferably, the backpurge gas is drawn from the gas feedstream leaving the other adsorption bed.

The desorption step is continued for a length of time sufficient to substantially restore the previous adsorption capacity of the bed. Preferably, that length of time is short enough that desorption can be accomplished using heat retained in the bed without other auxiliary heating. More preferably, the desorption step is carried out for a time short enough that one bed can be brought to desorption pressures, desorbed, and brought back to adsorption pressures while the other bed is in the adsorption step. The desorption step need not be continued for a time equal to the time of adsorption. The desorption step may be run for a shorter time than adsorption, so that both beds operate simultaneously in the adsorption step for a short period of time. Within those constraints, the preferred maximum and minimum time constraints for the desorption step are similar to those for the adsorption step.

A concentrated stream of desorbed oil-soluble vapor and backpurge gas is drawn through the inlet of the vacuum pump which creates the reduced pressure and is expelled from the outlet. In processes and apparatuses of the present invention, the pump is an oil-sealed pump, such as a rotary vane pump or a rotary piston pump.

To prevent absorption of oil-soluble vapor into the oil, oil in the pump is maintained at a temperature high enough that its ability to dissolve the oil-soluble vapor is restricted. The temperature of the oil is preferably above the dew point at which oil-soluble vapor condenses in the gas and vapor stream leaving the outlet of the pump. The temperature of the oil is more preferably at least about 30° C. above that dew point. The temperature of the oil is most preferably at least 45° C. above that dew point. The temperature is preferably below the temperature at which the oil or oil-soluble vapor decompose or substantially degrade. It is more preferably no more than about 190° C. For example, when the oil-soluble vapor is 1,1,1-trichloroethane, the temperature is preferably at least 75° C., more preferably at least 80° C., and is preferably no more than about 120° C., due to thermal decomposition of the oil-soluble vapor above that temperature.

Pumps specifically designed to operate at temperatures required by the present invention are commercially advertised and available. Ordinary oil-sealed pumps can be converted to operate at temperatures required by the present invention simply by insulating the pump with commercially available insulation and heating by known means, such as with electrical heating tape or by hot oil tracing. For some pumps which generate substantial heat during operation, sufficient heat may be maintained simply by disabling or limiting the cooling system of the pump.

The oil-soluble vapor and backpurge gas pass from the outlet of the pump to a vapor receiving means which receives the oil-soluble vapor and uses or disposes of it. For instance, the vapor receiving means may comprise a conduit leading to a workplace where the concentrated oil-soluble vapor stream may be used, or a conduit leading to an incinerator where the oil-soluble vapor is destroyed, or an apparatus for condensing and recovering said oil-soluble vapor.

Preferably, the vapor receiving means further comprises the following elements:
(6a) a condenser connected to the outlet of said oil-sealed vacuum pump such that it receives and condenses at least some of said desorbed oil-soluble vapor;
(6b) a condensate recovery means connected to said condenser into which condensed oil-soluble vapor passes; and
(6c) a recycle means connected to said condenser or condensate recovery means which returns uncondensed desorbed oil-soluble vapor to the feedstream.
The condenser is maintained at temperature and pressure conditions sufficient to condense a substantial proportion of the oil-soluble vapor. The pressure in the condenser is preferably slightly greater than the pressure of the feed gas stream passing to the adsorption beds. The condensed oil-soluble vapor is capture by a condensate recovery means, such as a recovered condensate tank.

The backpurge gas containing uncondensed desorbed oil-soluble vapor is returned to the feedstream by a recycle means such as a recycle line. If the pressure of the stream from the condenser is not at least slightly higher than the pressure of the feed gas stream, then a compressor pump may be necessary to increase the pressure so that oil-soluble vapor passes from the recycle means back into the feed gas stream.

In preferred processes of the present invention, the vapor receiving step further comprises the steps of:
(5a) subjecting said desorbed oil-soluble vapors and backpurge gas to temperature and pressure conditions under which at least some oil-soluble vapor condenses;
(5b) collecting said condensed oil-soluble vapor; and
(5c) returning uncondensed oil-soluble vapor and backpurge gas to said feedstream.
Conditions for each step are preferably those described previously in describing the apparatus.

The drawing depicts a preferred apparatus of the present invention, in which the vapor receiving means comprises a condenser 5, a recovered condensate tank 6 and a recycle line 18. If a different receiving means were desired, those elements and the lines connecting them would be replaced by a conduit leading, for instance, to a workplace or an incinerator.

The apparatus depicted contains a feed line 1 which passes a feed gas stream containing oil-soluble vapors through open valve 12 and into adsorption bed 11. Clean gas, i.e., gas substantially free of oil-soluble vapor, passes out through valve 14 along outflow line 16 and out vent 17 to the atmosphere or to subsequent processing. Oil-sealed pump 4 reduces the pressure in adsorption bed 21 through open valve 23. A slight flow of backpurge gas flows through backpurge line 2 through valve 3 and through valve 25 into adsorption bed 21. The backpurge gas and desorbed oil-soluble vapor travel from bed 21 through open valve 23 and through heated oil-sealed vacuum pump 4 to condenser 5. Oil-soluble vapor is condensed in condenser 5. Condensed oil-soluble vapor is trapped in recovered condensate tank 6. Condensate in tank 6 is recovered through condensate outflow 7. Backpurge gas containing uncondensed oil-soluble vapor passes through recycle line 18 back into feed line 1. Valves 13, 15, 22 and 24 are closed when bed 11 is in the adsorption stage and bed 21 is in the desorption stage.

When bed 21 is in the adsorption stage, valves 22 and 24 are open, and valves 23 and 25 are closed. When bed 11 is in the desorption stage, valves 12 and 14 are closed, and valves 15 and 13 are open. To control the flow of backpurge gas, valve 3 is preferably one whose opening can be accurately varied to points between full open and full shut, such as a needle valve. Valves 12, 22, 13, 23, 14, 24, 15, and 25 need not offer fine control of the flow. For instance, they may be ball valves or butterfly valves.

ILLUSTRATIVE EMBODIMENTS

The following example is for illustrative purposes only and is not to be taken as limiting either the specification or the claims. Unless stated otherwise, all parts and percentages are given by volume.

EXAMPLE 1

A pressure swing adsorption system is set up as described in the drawing wherein:
(a) beds 11 and 21 are 24 inches long and 2 inches in diameter having 4×10 mesh activated carbon therein;
(b) pump 4 is an insulated recirculated oil rotary vane pump, heated to about 80° C. with electrical heating tape, which draws pressures down to about 40 mm Hg in carbon beds being desorbed and pumps the pressure up to about atmospheric pressure in the condenser, recovered solvent tank and recycle line; and
(c) the temperature in condenser 5 is about 25° C.

The system is operated for several 10-minute cycles (10 minutes from when one bed begins adsorption until when the same bed begins adsorption again) with a feedstream of air containing 5,000 ppm 1,1,1-trichloroethane entering through line 1 at a rate of about one ft$^3$/min and a backpurge stream through needle valve 3 of 0.09 ft$^3$/min. When the system stabilizes, vented air passing through line 17 contains about 10 ppm 1,1,1-trichloroethane, corresponding to a 99.8 percent removal of solvent. Backpurge gas discharged from the pump contains about 23 percent by volume 1,1,1-trichloroethane and gas discharged from the condenser contains about 17 percent by volume 1,1,1-trichloroethane.

EXAMPLE 2

The system described in Example 1 is operated as described therein, except that the temperature of the oil in the vacuum pump is about 95° C. Similar results are obtained.

What is claimed is:

1. A process for recovering oil-soluble solvent, monomer or hydrocarbon vapor from a gaseous feedstream comprising the steps of
   (1) passing said gaseous feedstream containing oil-soluble vapor through a first adsorption bed containing a material that is effective to adsorb said oil-soluble vapor under conditions at which substantial oil-soluble vapor is adsorbed;
   (2) redirecting the flow of said gaseous feedstream to a second adsorption bed;
   (3) placing said first adsorption bed under reduced pressure generated by an oil-sealed vacuum pump in the presence of a backpurge gas stream running counter to the direction in which said gaseous feedstream flowed, under conditions such that oil-soluble vapor adsorbed upon said bed is desorbed and flows out of said bed with said backpurge stream;
   (4) drawing said desorbed oil-soluble vapor and backpurge gas stream through said oil-sealed vacuum pump while maintaining the oil in said pump at a temperature such that adsorption of vapor into the oil is restricted; and
   (5) passing desorbed oil-soluble vapor and backpurge gas from said vacuum pump to a vapor receiving step wherein said desorbed vapor is used, recovered or disposed of.

2. A process of claim 1 wherein said vapor receiving step further comprises the steps of:
   (5a) subjecting said desorbed oil-soluble vapor and backpurge gas to temperature and pressure conditions under which at least some oil-soluble vapor condenses;
   (5b) collecting said condensed vapor; and
   (5c) returning uncondensed vapor and backpurge gas to said feedstream.

3. A process of claim 2 wherein said adsorption step is continued for a period of time short enough that the heat of adsorption remains substantially in the bed.

4. A process of claim 3 wherein the oil in said vacuum pump is held at a temperature above the dew point of the oil-soluble vapor in the stream discharged from the outlet of said pump.

5. A process of claim 4 wherein the oil in said pump is held at a temperature at least 30° C. above the dew point of the desorbed oil-soluble vapor discharged from said pump.

6. A process of claim 5 wherein the oil in said pump is held at a temperature at least about 45° C. above the dew point of the discharge gas from said pump.

7. A process of claim 3 wherein oil from said pump is maintained at a temperature between about 80° C. and about 120° C., wherein the pressure during desorption is no more than about 50 mm Hg, wherein the pressure at which solvent condenses is no less than about atmospheric pressure and wherein the temperature at which solvent condenses is no more than about 25° C.

8. A process of claim 1 wherein said oil-soluble vapor is chosen from the group consisting of halogenated hydrocarbons and aromatic hydrocarbons.

9. A process of claim 8 wherein said oil-soluble vapor is chosen from the group consisting of 1,1,1-trichoroethane, methylene chloride, benzene, toluene, pentane, hexane, carbon tetrachloride, bromochloromethane, 1,2-butylene oxide, styrene, and ethanol.

10. An apparatus for recovering an oil-soluble solvent, monomer or hydrocarbon vapor from a gaseous feedstream comprising:
    (1) a plurality of adsorption beds containing a material that is effective to adsorb said oil-soluble vapor and is present in an amount sufficient to adsorb substantial amounts of said vapor;
    (2) a feed means for controllably directing said feedstream into said beds;
    (3) a backpurge means for controllably permitting a flow of backpurge gas through each said bed in a direction counter to the flow of said feedstream, when said bed is not receiving said feedstream;
    (4) an oil-sealed vacuum pump which operates at a temperature sufficient to maintain oil within the pump hot enough to restrict absorption of said oil-soluble vapor into the oil, said pump having an inlet and an outlet;
    (5) a conduit means controllably connected to each adsorption bed and to the inlet on said vacuum pump, such that said pump places each bed under reduced pressure while it is not receiving said feedstream, thereby desorbing at least some of said oil-soluble vapor and drawing said desorbed oil-soluble vapor and backpurge gas through said conduit means into the inlet on said vacuum pump; and
    (6) a vapor receiving means which receives desorbed oil-soluble vapor and backpurge gas from the outlet of said vacuum pump and uses or disposes of said vapor.

11. An apparatus of claim 10 wherein said vapor receiving means further comprises:
    (6a) a condenser connected to the outlet of said oil-sealed vacuum pump such that it receives and condenses at least some of said desorbed oil-soluble vapor;

(6b) a condensate recovery means connected to said condenser into which condensed vapor passes; and (6c) a recycle means connected to said condenser or condensate recovery means which returns uncondensed desorbed vapor to the feedstream.

12. An apparatus of claim 11 wherein oil in said vacuum pump is maintained at a temperature above the dew point of oil-soluble vapor in the stream leaving the pump.

13. An apparatus of claim 12 wherein oil in said vacuum pump is maintained at a temperature at least 30° C. above the dew point of oil-soluble vapor in the stream leaving the pump.

14. An apparatus of claim 13 wherein oil in said vacuum pump is maintained at a temperature at least 45° C. above the dew point of oil-soluble vapor in the stream leaving the pump.

15. An apparatus of claim 13 wherein said backpurge means draws backpurge gas from gas flowing out of the adsorption bed to which the feedstream is currently passing.

16. An apparatus of claim 13 wherein said vacuum pump reduces the pressure in said adsorption bed undergoing desorption to no more than about 100 mm Hg.

17. An apparatus of claim 16 wherein oil in said pump is maintained at a temperature of between about 80° C. and 120° C. during operation, wherein pressure in said condenser can be maintained at no less than about atmospheric pressure and wherein temperatures in said condenser are maintained at no more than about 25° C.

* * * * *

UNITED STATES PATENT AND TRADEMARK OFFICE
CERTIFICATE OF CORRECTION

PATENT NO. : 4,857,084

DATED : August 15, 1989

INVENTOR(S) : Lanny A. Robbins and Timothy C. Frank

It is certified that error appears in the above-identified patent and that said Letters Patent is hereby corrected as shown below:

Column 1, line 32, "codenser" should read -- condenser --.

Column 6, line 3, "capture" should read -- captured --.

Column 6, line 16, "vapors" should read -- vapor --.

Column 8, line 27, "claim 8" should read -- claim 1 --.

Signed and Sealed this

Twenty-fifth Day of September, 1990

Attest:

HARRY F. MANBECK, JR.

*Attesting Officer*    *Commissioner of Patents and Trademarks*